United States Patent
Hilmer

(10) Patent No.: US 7,329,835 B2
(45) Date of Patent: Feb. 12, 2008

(54) THREE DIMENSIONALLY DEFORMABLE HEATING ELEMENT, STEERING-WHEEL HEATER AND METHOD FOR PRODUCING A STEERING-WHEEL HEATER

(75) Inventor: Josef Hilmer, Gründau (DE)

(73) Assignee: I.G. Bauerhin GmbH, Grundau (DE)

( * ) Notice: Subject to any disclaimer, the term of this patent is extended or adjusted under 35 U.S.C. 154(b) by 188 days.

(21) Appl. No.: 10/926,837

(22) Filed: Aug. 25, 2004

(65) Prior Publication Data

US 2005/0067397 A1 Mar. 31, 2005

(30) Foreign Application Priority Data

Aug. 26, 2003 (DE) ................. 103 39 087

(51) Int. Cl.
*H05B 1/02* (2006.01)
(52) U.S. Cl. .................. 219/204; 219/202; 219/528; 219/546; 74/558.5
(58) Field of Classification Search ................ 219/202, 219/204, 203, 544, 546, 528; 428/423.4; 74/552, 538.5
See application file for complete search history.

(56) References Cited

U.S. PATENT DOCUMENTS

| | | | |
|---|---|---|---|
| 4,323,607 A * | 4/1982 | Nishimura et al. ......... 219/213 |
| 5,847,360 A | 12/1998 | Lorenzen et al. | |
| 6,177,198 B1 * | 1/2001 | Schaefer .................. 428/423.4 |
| 6,239,409 B1 | 5/2001 | Bonn et al. | |
| 6,727,467 B1 * | 4/2004 | Hadzizukic et al. ........ 219/204 |
| 6,762,394 B2 * | 7/2004 | Hobby ....................... 219/204 |
| 6,838,647 B2 | 1/2005 | Nagele et al. | |
| 2005/0067397 A1 | 3/2005 | Hilmer | |

FOREIGN PATENT DOCUMENTS

| | | |
|---|---|---|
| DE | 77 37 437 U1 | 3/1978 |
| WO | WO-99/12789 A1 | 3/1999 |
| WO | WO-99/39963 A1 | 8/1999 |

* cited by examiner

Primary Examiner—Mark Paschall
(74) Attorney, Agent, or Firm—Darby & Darby

(57) ABSTRACT

A three-dimensional heating element particularly intended for use in a steering-wheel. The three-dimensional heating element includes a heating composite having a heating element bonded between two films, one or both of which includes a heat shrinkable material. A covering material is placed over the heating composite. The film closest to the covering material includes a plastic material which forms a barrier preventing gaseous, liquid and/or solid chemicals from attacking the heating conductor when the heating element is applied to the steering-wheel. A foam material may be introduced in the space between the composite and covering material.

11 Claims, 2 Drawing Sheets

Figure 1:
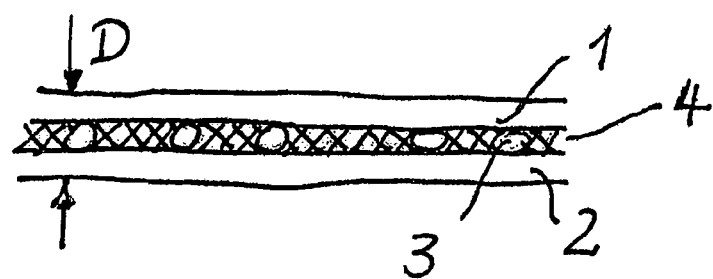

THREE DIMENSIONALLY DEFORMABLE HEATING ELEMENT, STEERING-WHEEL HEATER AND METHOD FOR PRODUCING A STEERING-WHEEL HEATER

This invention relates to a three-dimensionally deformable heating element, especially for use with heatable operator surfaces and steering wheels. More particularly, the invention relates to a steering-wheel heater including one or more heating conductors, and to a method for producing such a steering-wheel heater.

BACKGROUND OF THE INVENTION

Conventionally, heating elements of the type referred to above are built up on a flexible base material, such as a nonwoven material, which is attached to the body of the steering wheel by gluing, for example. A soft base material is required, especially when the covering over the base material has a special structure, such as burls or knobs or the like. This construction is selected for various reasons. First, it protects the heater on the hard body by embedding it in a soft material; second, it provides a pleasant feel in conjunction with the structures of the steering wheel.

It is, however, a problem to manufacture such a construction. To begin with, the soft base material must be fastened to the hard body of the steering wheel. In so doing, it is necessary to ensure that the heat conductor material reaches the correct place and can be fixed there without damaging the heat conductor. The covering must then be fixed carefully, so that the heat conductors do not slip to one side and are not damaged by mechanical stresses exerted on the composite of materials.

Furthermore, the finished heating element tends to suffer increased wear due to corrosion in conjunction with mechanical stresses. Corrosion is promoted due to aggressive, gaseous, liquid or dissolved solid chemicals, which are present in perspiration and detergents, or arise due to the action of heat on the several plastics that are combined by adhesives and/or solvents, and which penetrate through the covering material.

The corrosion phenomena, which occur under the conditions given above, are intensified from the start because, especially during colder times, appreciable currents flow through the heating elements. At the heating conductors that are weakened by corrosion, these currents bring about a higher than desirable voltage drop, so that temperature differences may occur which have a disadvantageous effect in the regions which are handled and, in addition, accelerate the incipient decomposition and/or dissolving process at the heating wires.

It is an object of the present invention to avoid the disadvantages that have been described and to develop a three-dimensionally deformable heating element, especially for heatable operator surfaces and for steering wheels, the deformable heating element being easily produced and being durable for a long time even under corrosive conditions. Due to the use of stranded material, it is possible to develop an even tighter and nevertheless more uniform distribution of heat on the heating element; moreover, by means of three-dimensional deformation, regions with no heating conductors and regions with a tighter arrangement of heating conductors are created, while the total wall thickness of the steering wheel heater is uniform, in order to make a concerted increase or decrease in temperature possible.

The corrosion resistance of heating conductors which are disposed on a film (base material) and over which at least one covering film is placed, can be improved significantly. This is the case especially for foamed steering wheels, for which a polyurethane foam material is pressed under pressure beneath the steering wheel cover. It has been discovered that the penetration of corrosive materials through the porous foam material, especially at places where the thickness of the film is slight, can be prevented with certainty by the use of a covering film which functions as a barrier layer for gaseous, liquid and or dissolved solid chemicals.

Moreover, if a steering wheel heater is produced with a covering film of a polyurethane material, it is significantly easier to press the polyurethane foam into the gap between the steering wheel cover and the covering material because the flow behavior of the polyurethane foam on the similar polyurethane covering layer is particularly advantageous because of the low frictional losses and the advantageous interfacial tension even when the cross sections of the gaps between the covering film and the covering material are very small.

A further advantage of the inventive heating element construction is that the device for producing three-dimensionally deformed heating elements is acted upon by smaller forces and working pressures, so that the danger of material defects is reduced. Due to the use of shrink film as a covering layer, it is possible to produce a three-dimensionally deformed heating surface in one operation with a tighter arrangement of heating conductors or with spaces free of heating conductors. This is particularly advantageous in conjunction with a self-adhering film as base material, on which the heating conductors are mounted, taking into consideration the later three-dimensional deformation. Accordingly, heating surfaces with a denser arrangement of heating conductors and with spaces free of heating conductors can be produced in one operation.

THE DRAWINGS

Figure 2:
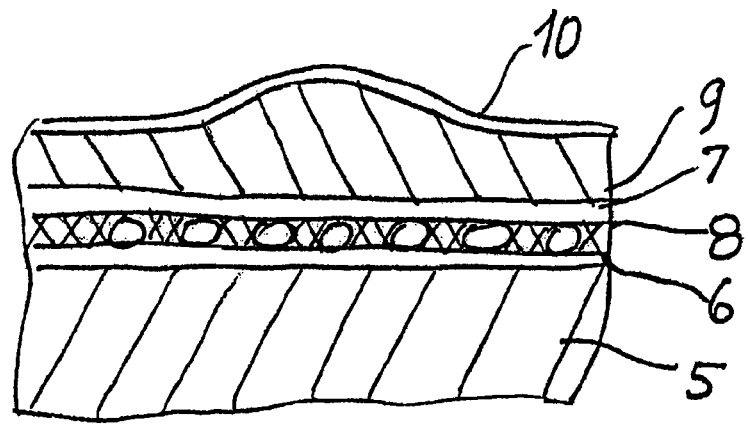
Figure 3:
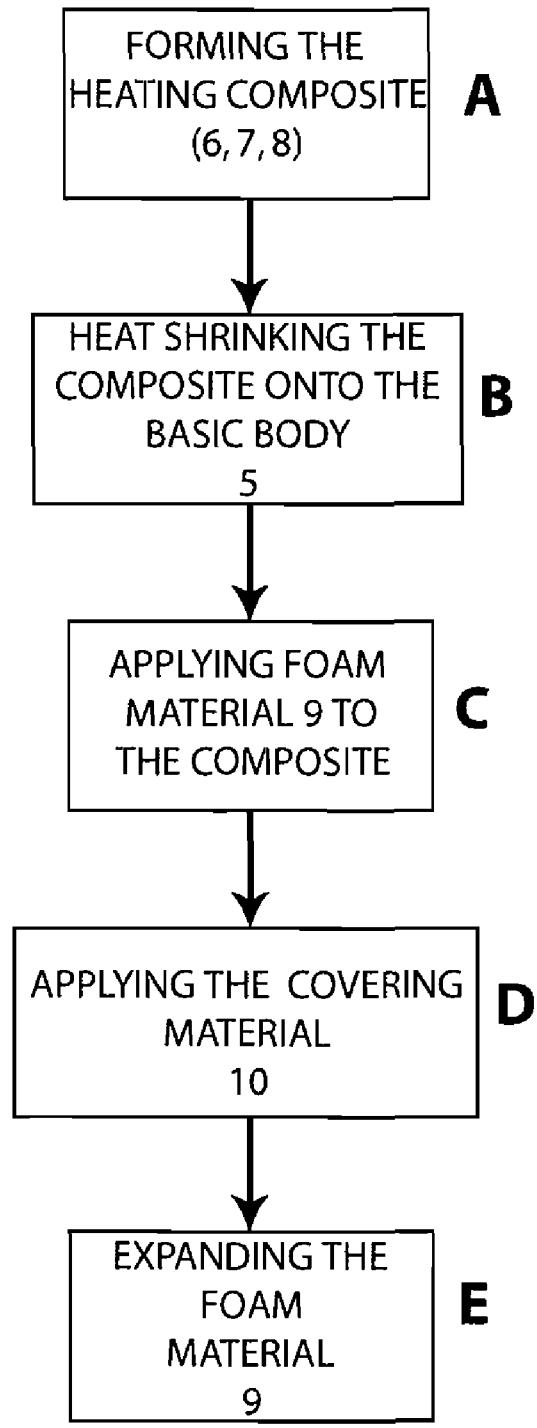

FIG. 1 shows a cross section through a heating element built up pursuant to the invention, FIG. 2 shows a cross-section through a steering-wheel heater, built up pursuant to the invention, and FIG. 3 shows a diagrammatic view of the process of producing a steering-wheel heater pursuant to the invention.

DETAILED DESCRIPTION

In FIG. 1, the simplest construction of an inventive heating element is shown in section. A heating conductor 3 is embedded in an adhesive 4 between two films 1, 2. The films may consist of a high-molecular weight plastic, such as a polyurethane. The thickness D of the total composite is 200 μm plus the thickness of the heating conductor. A constant thickness of the heating composite, as shown in FIGS. 1 and 2, can be attained by using stranded material as the heating conductor.

The new construction of a steering wheel, produced pursuant to the invention, is shown in the diagrammatic representation of FIG. 2. A heating composite of two films 6 and 7, between which a heating conductor 8 was previously embedded, is shrunk on the basic body of a steering-wheel. Film 7 may be a polyurethane film, on which a polyurethane foam 9 can be applied and joined particularly firmly and inherently stably. The final step in the construction of the steering-wheel heater is the affixing of a covering material 10.

FIG. 3 shows the manufacturing process with the following individual steps of:

A two films (6, 7) are glued with the heating conductor (8) to form a heating composite;

B the films (6, 7) are shrunk by the application of heat onto the basic body 5;

C polyurethane foam material (9) is applied;

D the composite is covered with a covering material (10); and

E the polyurethane in the intermediate region is foamed.

The new method can be carried out in a device which contains the starting materials of films and heating conductor in the form of rolls. The film blanks are combined with a stranded heating conductor and put over the steering wheel preform. The composite is then shrunk under the action of heat and, with that, fixed on the steering wheel preform.

The cover material 10 is pulled over the composite and the final shape of the steering wheel is produced by foaming under pressure.

In the preferred embodiment of the invention, one or more heating conductors made of copper or a copper alloy may be used. The conductor(s) may be arrayed in a meandering fashion although any suitable configuration is contemplated. Alternatively, the heating conductor may consist of chromium nickel or chromium nickel alloys. The heating conductor or conductors may be connected into one or more conventional heating circuits. If multiple heating circuits are used they may be connected in parallel. Likewise, multiple heating conductors may be connected in series to provide a heating circuit. It is preferred that each heating conductor be formed from individual strands, for example as a braid. Conventional braided configurations may be employed with multiple insulated strands braided together. The insulation for the strands of the braid may be polyester and/or polyurethane.

It is preferred that both of the films 6 and 7 be formed from a shrink film but the benefits of the invention can be achieved if only film is a shrink film. In the preferred embodiment, the total thickness of the two films in between 5 and 200 µm. The films may be made of polyurethane.

Other areas of application for the inventive, three-dimensionally deformable heating element are:

seat covers, armrests, neck supports, heatable handles or shelves, floor mats or heatable operator surfaces. With a separate power supply, it is also possible to construct items of clothing or gloves pursuant to the invention.

What is claimed is:

1. A heatable steering wheel, comprising a basic body shaped as a steering wheel, a heating element comprising a heating conductor embedded between two films made of heat shrinkable polyurethane, the total thickness of the two films being between 10 and 200 µm, wherein the heating element is heat shrunk onto the basic body, an expanded foam material disposed over the heating element, and a covering material positioned over the foam material, wherein at least the film closest to the covering material forms a barrier layer for vapors and liquids, the steering wheel being shaped by expanding the foam material under pressure.

2. A three-dimensionally deformable heating element according to claim 1, wherein the heating conductor consists of copper or a copper alloy.

3. A three-dimensionally deformable heating element according to claim 1, wherein the heating conductor consists of chromium-nickel or a chromium-nickel alloy.

4. A three-dimensionally deformable heating element according to claim 1, wherein the heating conductor is connected into at least one heating circuit.

5. A three-dimensionally deformable heating element according to claim 1, wherein there are plural heating circuits connected in parallel.

6. A three-dimensionally deformable heating element according to claim 1, wherein the plural heating elements are provided and connected in series.

7. A three-dimensionally deformable heating element according to claim 1, wherein the heating connector consists of braided wires.

8. A three-dimensionally deformable heating element according to claim 7, wherein each of said wires includes electrical insulation.

9. A three-dimensionally deformable heating element according to claim 8, wherein the electrical insulation comprises a polyester and/or polyurethane.

10. A method for producing a heatable steering wheel which comprises a steering-wheel shaped basic body having at least one heating conductor embedded therein, and a covering material, comprising the steps of:

positioning the heating conductor between two films to form a heating element;

applying the heating element to the basic body;

applying heat to the heating element causing the heating conductor and films to be shrunk onto the basic body; and applying the covering material.

11. A method for producing a heatable steering wheel according to claim 10, further including the step of applying a foam material to the heating element before applying the covering material and then causing the foam material to expand under pressure after the covering material has been applied.

* * * * *